US009002568B2

(12) United States Patent
Datta et al.

(10) Patent No.: US 9,002,568 B2
(45) Date of Patent: Apr. 7, 2015

(54) METHOD FOR CONDITIONING ONE OR MORE ASPECTS OF A VEHICLE

(75) Inventors: Reena L. Datta, Rochester Hills, MI (US); Kevin S. Kidston, New Hudson, MI (US); Michael R. Colville, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1171 days.

(21) Appl. No.: 12/640,888

(22) Filed: Dec. 17, 2009

(65) Prior Publication Data

US 2011/0153140 A1    Jun. 23, 2011

(51) Int. Cl.
  *B60H 1/00*    (2006.01)
  *G05D 23/00*   (2006.01)
  *B60R 16/037*  (2006.01)
  *B60R 16/02*   (2006.01)
  *G07C 5/00*    (2006.01)

(52) U.S. Cl.
  CPC .............. *B60R 16/037* (2013.01); *B60R 16/02* (2013.01); *G07C 5/00* (2013.01)

(58) Field of Classification Search
  USPC ......... 701/29.1, 1; 700/276; 62/157, 231, 230
  See application file for complete search history.

(56) References Cited

U.S. PATENT DOCUMENTS

| | | | |
|---|---|---|---|
| 7,334,544 B2 * | 2/2008 | Eberspach | 123/41.1 |
| 8,341,971 B2 * | 1/2013 | Oyobe et al. | 62/157 |
| 2003/0183184 A1 * | 10/2003 | Murray et al. | 123/142.5 R |
| 2007/0272290 A1 * | 11/2007 | Sims et al. | 136/201 |
| 2010/0206957 A1 * | 8/2010 | Vyas et al. | 236/46 R |

* cited by examiner

*Primary Examiner* — Adam Tissot
(74) *Attorney, Agent, or Firm* — Reising Ethington P.C.; Lionel D. Anderson

(57) ABSTRACT

A method for conditioning one or more aspects of a vehicle, where a user may customize their vehicle by providing desired departure times and conditioning preferences so that the vehicle automatically wakes up, performs the requested conditioning, and is ready for operation by the requested departure time. Some examples of potential conditioning events include activating: a heated or cooled seat, a heated steering wheel, a heated engine block, a heated mirror, a cabin heating ventilation and air conditioning (HVAC) system, a heating or cooling element for a battery pack, a heating or cooling element for a battery charger, and a heating or cooling element for a fuel cell, to name a few.

21 Claims, 2 Drawing Sheets

METHOD FOR CONDITIONING ONE OR MORE ASPECTS OF A VEHICLE

TECHNICAL FIELD

The present invention generally relates to a method for conditioning one or more aspects of a vehicle and, more particularly, to a method where a user may customize their vehicle by providing desired departure times and conditioning preferences so that the vehicle automatically wakes up, performs the requested conditioning, and is ready for operation by the requested departure time.

BACKGROUND

Some vehicles provide a user with the ability to remotely activate vehicle features before the user gets into the vehicle, so that the vehicle is more comfortable when the user actually goes to operate it. One such example is a remote start feature. However, most remote start features turn the entire vehicle on when a user manually activates the feature with a key fob; this can produce certain inefficiencies.

For instance, most remote start features rely on the user to estimate the amount of time that is needed to warm up the vehicle or perform some other task. If the user underestimates the amount of time needed, then the vehicle may still be cold when they go to use the vehicle; if the user overestimates the amount of time needed, then the vehicle may unnecessarily waste fuel while it is waiting. Typically, this amount of time is non-configurable. Most remote start features also turn the entire vehicle on even though the user may only wish to activate certain select features. This too may result in unnecessary fuel consumption.

SUMMARY

According to one embodiment, there is provided a method for conditioning one or more aspects of a vehicle. The method may comprise the steps of: (a) receiving a departure time; (b) sensing a vehicle condition; (c) executing a conditioning algorithm, wherein the conditioning algorithm uses the departure time and the vehicle condition to determine a conditioning start time; and (d) conditioning one or more aspects of the vehicle at the conditioning start time.

According to another embodiment, there is provided a method for conditioning one or more aspects of a vehicle. The method may comprise the steps of: (a) receiving a departure time; (b) receiving a conditioning preference; (c) executing a conditioning algorithm, wherein the conditioning algorithm uses the departure time and the conditioning preference to determine a conditioning start time; and (d) conditioning one or more aspects of the vehicle at the conditioning start time.

According to another embodiment, there is provided a method for conditioning one or more aspects of a vehicle. The method may comprise the steps of: (a) receiving a departure time; (b) receiving a conditioning preference; (c) sensing a first vehicle condition; (d) executing a conditioning algorithm, wherein the conditioning algorithm uses the conditioning preference and the first vehicle condition to determine a conditioning duration, and the conditioning algorithm uses the departure time and the conditioning duration to determine a conditioning start time; (e) waking up the vehicle and sensing a second vehicle condition at some time before the conditioning start time, if the first and second vehicle conditions differ by a certain degree then executing the conditioning algorithm again to determine a new conditioning start time, and if the first and second vehicle conditions do not differ by a certain degree then keeping the initial conditioning start time; and (f) conditioning one or more aspects of the vehicle at the conditioning start time.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
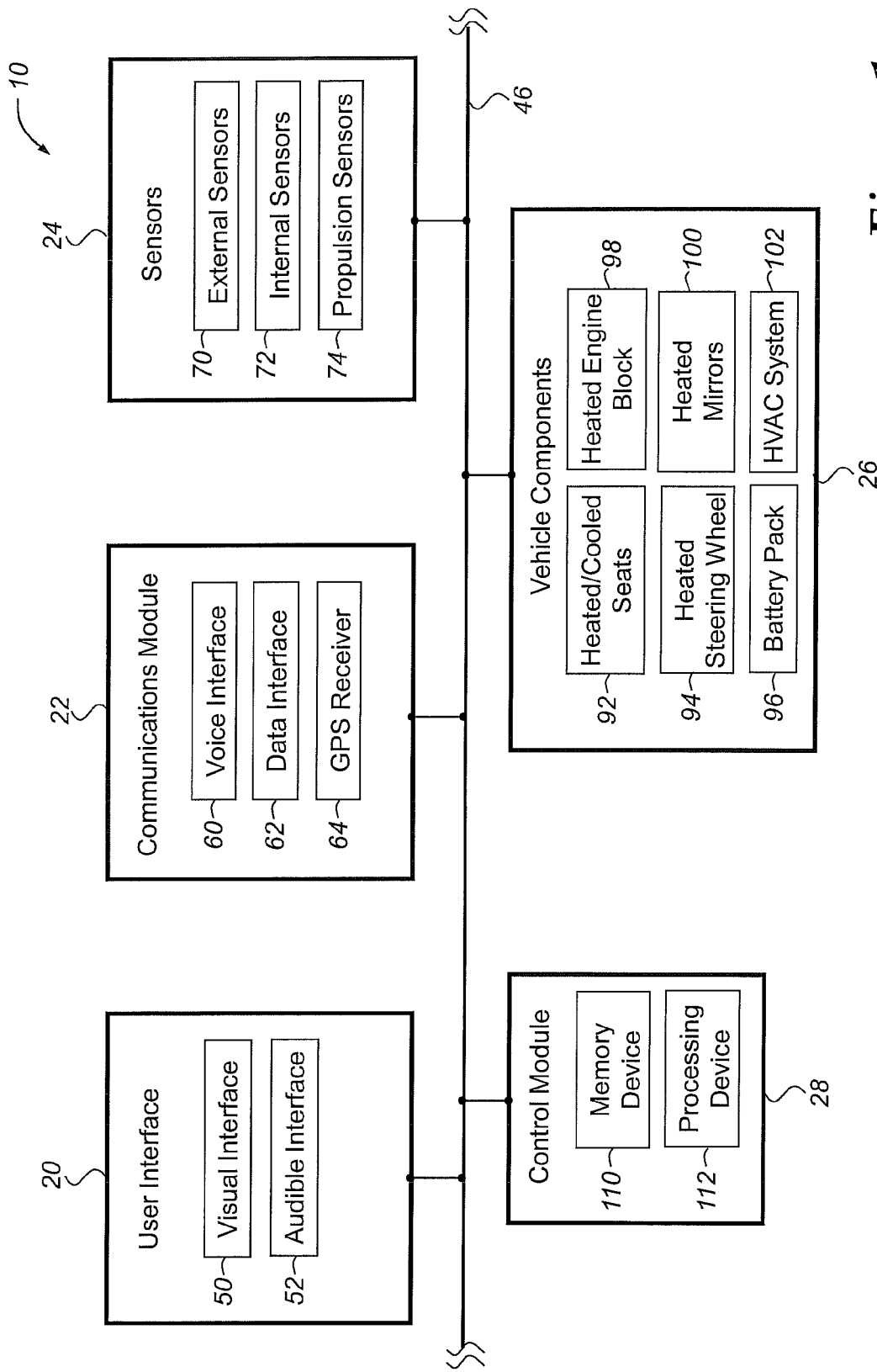
FIG. 1 is a schematic block diagram of an exemplary vehicle conditioning system.

With reference to FIG. 1, there is shown a general and schematic view of an exemplary vehicle conditioning system 10 that may be used to condition one or more aspects of a vehicle. The exemplary method described below enables a user to customize their vehicle so that the vehicle automatically wakes up, conditions certain aspects according to conditioning preferences, and prepares the vehicle for operation by a desired departure time. Moreover, the exemplary method uses a conditioning algorithm to estimate the amount of time that is needed to perform the conditioning tasks by the desired departure time so that energy costs are kept to a minimum. It should be appreciated that the present method may be used with any type of vehicle, including: hybrid electric vehicles (HEVs), plug-in hybrid electric vehicles (PHEVs), battery electrical vehicles (BEVs), fuel cell vehicles, and traditional vehicles having internal combustion engines (ICEs). The method described herein is not limited to the particular vehicle conditioning system shown in FIG. 1, and may be used with any number of different vehicle systems. According to one exemplary embodiment, vehicle conditioning system 10 generally includes a user interface 20, a communications module 22, sensors 24, vehicle components 26, and a control module 28.

User interface 20 may include any combination of hardware, software and/or other components that are located within the vehicle and enable a vehicle user to exchange information or data with the vehicle. This includes, for example, wired input components like a touch-screen display, a microphone, a keyboard, a pushbutton or other control where user interface 20 receives information from a user, as well as output components like a visual display, an instrument panel, or an audio system where user interface 20 provides information to the user. In some cases, user interface 20 may include components with both input and output capabilities, such as the exemplary visual interface 50 and audible interface 52 shown in FIG. 1. Visual interface 50 may include any suitable interface that is located within the vehicle and visually presents information to and/or receives information from a user, and it may be driven by a sequence of navigable menus that enable a user to exchange information with vehicle conditioning system 10. Audible interface 52 includes any suitable interface that is located within the vehicle and audibly presents information to and/or receives information from a user, and it may be part of an on-board automated voice processing system that uses voice-recognition and/or other human-machine interface (HMI) technology.

User interface 20 may be used by the method described below to facilitate the exchange of information between a user and the vehicle. For instance, user interface 20 may receive departure times, conditioning preferences, vehicle conditions, and/or other input from a user, as well as to provide conditioning status, reports and/or other output to a user. The user interface may be a stand-alone module; it may be part of an infotainment system or part of some other module, device or system in the vehicle; it may be mounted on a dashboard (e.g., with a driver information center (DIC)); it may be projected onto a windshield (e.g., with a heads-up display); it may be integrated within an existing audio system; or it may simply include an electronic connection or port for connecting with a laptop or other computing device, to cite a few examples. Various other user interfaces can also be utilized, as the exemplary interfaces described herein represent only some of the possibilities. The present method may utilize any user interface to exchange information between a user and the vehicle, and is not limited to any particular type.

Communications module 22 may include any combination of hardware, software and/or other components that enable wireless voice and/or data communication with the vehicle. According to one exemplary embodiment, communications module 22 includes a voice interface 60, a data interface 62, and a GPS receiver 64, and may be bundled or included within a device such as a telematics unit. Voice interface 60 enables voice communication to and from the vehicle and may include a cellular chipset (e.g., CDMA or GSM chipsets), a vocoder, voice over IP (VoIP) equipment, and/or any other suitable device. Data interface 62, on the other hand, enables data communication to and from the vehicle and may include a modem (e.g., a modem using EVDO, CDMA, GPRS, or EDGE technologies), a wireless networking component (e.g., one using an IEEE 802.11 protocol, WiMAX, BlueTooth, etc.), or any other suitable device. Depending on the particular embodiment, communications module 22 may communicate over a wireless carrier system (e.g., a cellular network), a wireless network (e.g., a wireless LAN, WAN, etc.), or some other wireless medium. For combined services that involve both voice and data communications, communications module 22 can utilize a single call over a voice channel and switch as needed between voice and data transmission, and this can be done using techniques known to those skilled in the art. The equivalent can also be done over a data channel. GPS receiver 64 receives signals from a constellation of GPS satellites and uses these signals to determine vehicle position, as is well understood in the art.

The present method may use communications module 22 to receive departure times, conditioning preferences, vehicle conditions and/or other information from entities that are remotely located from the vehicle. This includes remote users who enter such information via a website or mobile device and then send it to the vehicle. In one embodiment, communications module 22 acts as an alternative to user interface 20 for exchanging information between a user and the vehicle; in another embodiment, communications module 22 and user interface 20 are both used to exchange such information; and in yet another embodiment, only user interface 20 is used to exchange such information. Other embodiments and arrangements are also possible. The method described below is not limited to use with any particular communications module or technology, and it may be used with devices other than the exemplary communications module shown here.

Sensors 24 may include any combination of hardware and/or software components that are capable of monitoring, sensing or otherwise determining vehicle conditions, including conditions inside and outside of the vehicle. According to one exemplary embodiment, sensors 24 include external sensors 70 and internal sensors 72; other sensors may be provided and used as well. External sensors 70 sense and report different vehicle conditions that are outside of the vehicle but may still affect the vehicle. This includes environmental sensors (e.g., sensors that measure the outside temperature, humidity, precipitation, etc.), which determine one or more vehicle conditions that are exterior to vehicle but may still affect the vehicle. Internal sensors 72, on the other hand, sense and report different vehicle conditions inside of the vehicle. Such internal sensors may include environmental sensors (e.g., sensors that measure internal cabin conditions like cabin temperature, humidity, etc.) and component sensors that monitor the settings, temperature or other conditions of different vehicle components (e.g., sensors coupled to heated seats, heated steering wheels, engine block heaters, HVAC systems, etc.). Any type of sensor that detects conditions within the vehicle may be an internal sensor 72. Propulsion sensors 74 sense and report conditions that generally pertain to a vehicle propulsion system (e.g., sensors for monitoring battery pack or fuel cell temperatures, voltages, amperages, etc., engine or transmission coolant temperatures, fluid viscosity, etc.).

Sensors 24 may be integrated within some vehicle component, device, module, system, etc. (e.g., sensors within a vehicle battery pack, within a control module, within an energy management system, etc.), they may be stand-alone components (as schematically shown in FIG. 1), or they may be provided according to some other arrangement. Furthermore, sensors 24 may employ any suitable technique or method for measuring, estimating, evaluating, filtering, etc.; this includes both directly and indirectly determining vehicle conditions. Output from sensors 24 may be provided to control module 28 or to some other device in the form of readings via a suitable communications connection 46 (e.g, a CAN bus, a SPI connection, etc.). The method described herein uses vehicle conditions from sensors 24 when performing or executing a conditioning algorithm, as will be explained. No particular type of sensor, specific technique for gathering or processing the vehicle conditions, or particular method for providing the vehicle conditions is required for the present method. For instance, it is possible for sensors 24 to receive vehicle conditions like external weather conditions from a weather-related service or website that monitors external conditions and wirelessly communicates those conditions to the vehicle via communications module 22. Other examples of sensors 24 are possible as well.

Vehicle components 26 may include any component that is located on the vehicle and has a thermal output that can be managed, controlled or otherwise manipulated according to a conditioning preference. Examples of such vehicle components include heated and/or cooled seats 92, a heated steering wheel 94, a battery pack 96 for a plug-in hybrid electric vehicle (PHEV), a hybrid electric vehicle (HEV) or a battery electric vehicle (BEV), a heated engine block 98, heated mirrors 100, and a cabin heating ventilation and air conditioning (HVAC) system 102, as well as other components like heated windshield wipers and defrost systems. Each of the preceding examples represents a vehicle component that is located on the vehicle and has some type of controllable thermal output that can raise and/or lower the temperature of the component or the surrounding environment. For instance, the heated/cooled seats 92, heated steering wheel 94, heated engine block 98 and heated mirrors 100 may all be activated and controlled via thermal settings (e.g., on/off settings; low, medium and high settings; actual temperature settings, etc.). The battery pack 96 and/or HVAC system 102 may be activated and controlled according to more complex settings (e.g., algorithmically determined settings, etc.). In the case of the battery pack 96, there may be heating and/or cooling elements operably coupled to a battery charger or the actual battery pack; these may include, for example, cooling fans, water jackets, air passages, heat sinks, thermoelectric coolers (e.g., Peltier devices), heating elements, condensers, or some combination thereof. Vehicle components 26 may include passive devices (i.e., devices that rely on the ambient environment to manipulate temperature), active devices (i.e., devices that actively add or remove heat from the system to manipulate temperature), or both.

Skilled artisans will appreciate that battery packs and fuel cells sometimes operate best when they are within a certain temperature range. Therefore, by conditioning the battery pack and/or fuel cell before the user goes to operate the vehicle, performance can be increased while wear-and-tear on these and other components of the propulsion system may be decreased. Other potential benefits of bringing a battery pack and/or fuel cell to a desired condition or state before a user operates the vehicle may also be enjoyed. Certain battery packs may operate better in exothermic or endothermic environments, thus, appropriate conditioning may be needed in order to maintain battery pack 96 within ideal conditions. In one example, a battery pack in a battery electric vehicle (BEV) may require heating if it is a large battery with good heat dissipation and is subject to a low temperature rise due to its high thermal capacity. However, in another embodiment, a battery pack in a hybrid electric vehicle (HEV) may require cooling since it must handle the same power with a smaller size, a low thermal capacity, and lower heat dissipation. Therefore, it may be desirable to control or otherwise manipulate the temperature of battery pack 96 so that it is maintained in an optimum temperature range at the start of vehicle operation. The same may be true for fuel cells and internal combustion engines.

The present method may use vehicle components 26 to control thermal conditions around the vehicle according to conditioning preferences, so that the vehicle is more comfortable or better suited for performance when the user goes to operate the vehicle at the desired departure time. Consider the example where a user has provided a number of conditioning preferences for warming up a PHEV, HEV or BEV on a cold day. The method described herein may instruct heated seats 92, heated steering wheel 94 and heated mirrors 100 to operate on a medium setting and HVAC system 102 to raise the cabin temperature to a desired temperature, for example 22° C. The preceding actions are generally aimed at improving the comfort of the vehicle for the user, whereas the following action is aimed at improving the performance and/or longevity of the vehicle. The present method may also instruct heating elements associated with battery pack 96 to warm up the battery pack to a desired temperature range which improves the operating efficiency of the battery pack and reduces wear-and-tear. These are, of course, only some of the possibilities for vehicle components 26, as the present method may control or manage the vehicle components in any number of different ways.

Control module 28 may include any combination of electronic processing devices, memory devices, input/output (I/O) devices, and/or other known components, and may perform various control and/or communication related functions. In an exemplary embodiment, control module 28 includes an electronic memory device 110 and an electronic processing device 112. Memory device 110 may include any type of suitable electronic memory means and may store a variety of data and information. This includes, for example, desired departure times and conditioning preferences (e.g., those provided by a user), sensed vehicle conditions (e.g., those provided by sensors 24), look-up tables and other data structures, algorithms (e.g., the conditioning algorithm described below), vehicle component characteristics and background information (e.g., temperature limits, temperature profiles, operational settings, etc. for the different vehicle components 26), etc. The conditioning algorithm described below—as well as any combination of information needed to perform such algorithm—may be stored or otherwise maintained in memory device 110. Processing device 112 may include any type of suitable electronic processor (e.g., a microprocessor, a microcontroller, an application specific integrated circuit (ASIC), etc.) that executes instructions for software, firmware, programs, algorithms, scripts, etc. The exemplary processor 112 is not limited to any one type of component or device. Control module 28 may be electronically connected to other vehicle devices and modules via a suitable connection 46 and can interact with them as required. These are, of course, only some of the possible arrangements, functions and capabilities of control module 28, as others are certainly possible.

Depending on the particular embodiment, control module 28 may be a stand-alone vehicle electronic module (e.g., a vehicle control integrated module (VCIM), a traction power inverter module (TPIM), a battery power inverter module (BPIM), etc.), it may be incorporated or included within another vehicle electronic module (e.g., a power train control module or a hybrid control module), or it may be part of a larger network or system (e.g., a battery management system (BMS), a vehicle energy management system, etc.), to name a few possibilities. Many different types and arrangements for control module 28 may be used with the method described below, as the present method is not limited to any one embodiment.

Figure 2:
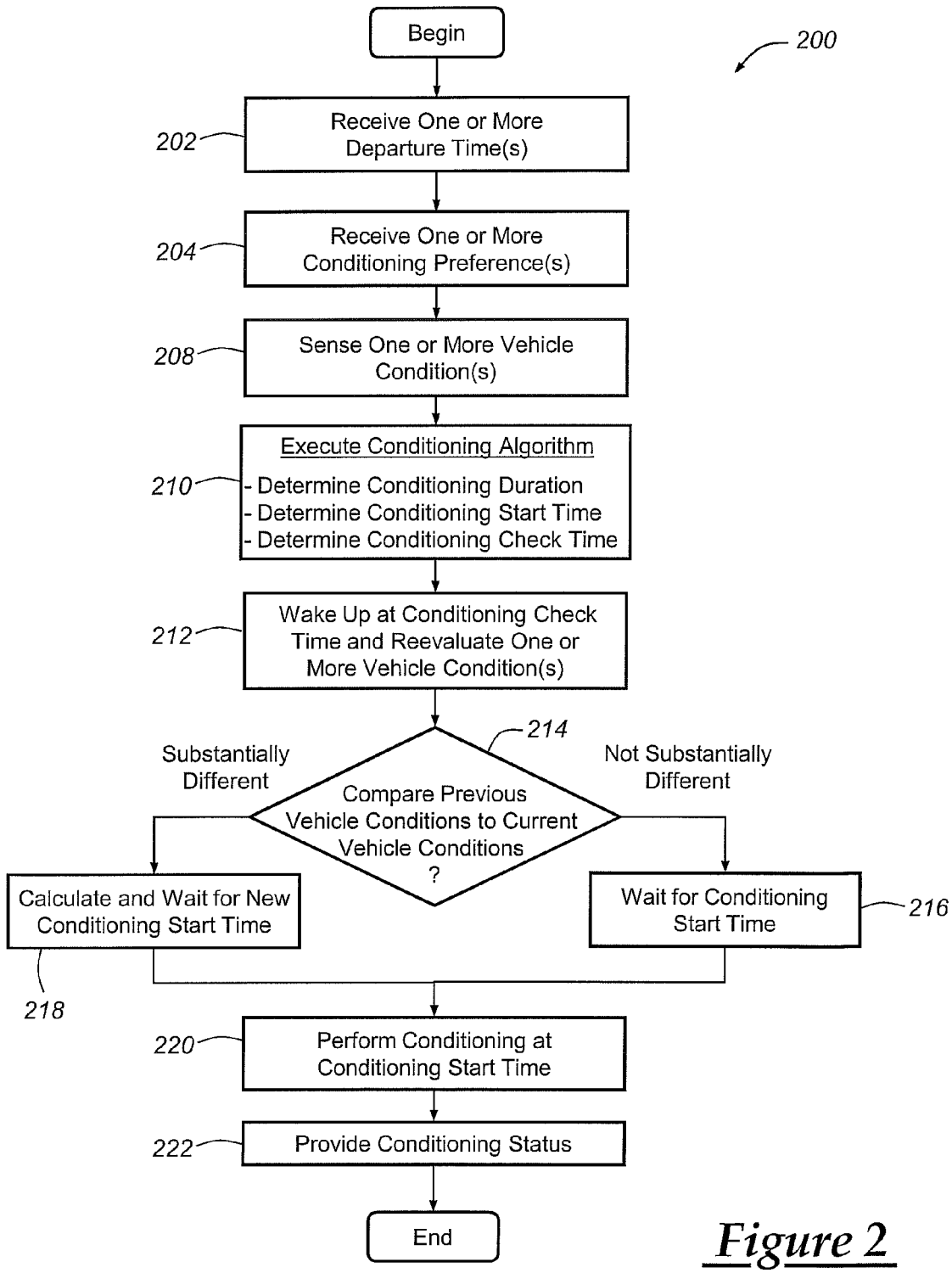
FIG. 2 is a flowchart of an exemplary method that may be used to condition one or more aspects of a vehicle and may be used with the exemplary system of FIG. 1.

Turning now to FIG. 2, there is shown an exemplary method 200 for conditioning one or more aspects of a vehicle so that the vehicle is ready for use at a desired departure time. The term "conditioning," as used herein, broadly includes any activity where a thermal aspect of a vehicle is altered, manipulated or controlled. Some non-limiting examples of "conditioning" include: controlling a vehicle HVAC system so that the vehicle cabin is maintained at a comfortable temperature; controlling a heated device (e.g., a heated seat, heated steering wheel, heated engine block, heated mirrors, etc.) so that the device is at a desired temperature or state; controlling a heating and/or cooling element coupled to a vehicle battery pack so that the battery pack can be maintained in a desired temperature range, etc. The conditioning activities in each of the preceding examples can be programmed by a vehicle user so that one or more aspects of the vehicle are conditioned and ready to go at a desired departure time. This may improve the driving experience, increase the performance of the vehicle, and/or lower the corresponding energy costs, to cite a few possibilities. Although the following description is provided in the context of a plug-in hybrid electric vehicle (PHEV), it should be appreciated that the present method may be used with any type of vehicle including, but certainly not limited to, plug-in hybrid electric vehicles (PHEVs), hybrid electric vehicle (HEVs), battery electric vehicles (BEVs), fuel cell vehicles, as well as conventional vehicles having internal combustion engines.

Beginning with step 202, the method receives one or more departure time(s) from a vehicle user. A departure time is the point at which the vehicle user wishes to use or operate the vehicle, and it can be any time, day, date or combination thereof. Departure times do not need to be the same every day, although they can be. For instance, departure times could be 7:00 AM (leave home for work) and 5:00 PM (leave work for home) on Monday-Thursday, no departure time on Saturday, and 9:00 AM on Sunday. In another example, a departure time could be associated with a particular date, such as one saved in an electronic calendar. On Monday the $2^{nd}$, for example, departure times could be 8:30 AM (to accommodate a 9:00 AM meeting) and 4:30 PM (a bit earlier than usual for a dinner engagement), and Tuesday the $3^{rd}$ could have a single departure time of 8:00 AM (no evening departure time because user is not sure when they are leaving work that day). Thus, departure times can be provided on a day-by-day basis, a week-by-week basis, a month-by-month basis, or otherwise. The preceding examples are only meant to illustrate some of the potential departure times that may be used with this method, as any departure time (no matter how it is expressed or provided) may be received in step 202.

Departure times may be received in step 202 according to a variety of different methods and techniques. For instance, step 202 may receive one or more departure times from a user via an in-vehicle user interface 20, communications module 22, or any other suitable method. According to the in-vehicle user interface example, a vehicle user can enter one or more departure times by navigating visual and/or audible menus of user interface 20 and providing the desired departure times when asked. In a first wireless communication example, a user can have an application or other program installed on their mobile phone (e.g., an iPhone® app.), PDA, computer, etc., where the application receives, formats and wirelessly delivers the departure time information from a user to the vehicle via communications module 22. In a second wireless communication example, a wireless or wired connection can be used to transfer information from a calendar or other program, such as Microsoft® Outlook® or Google® Calendar, to the vehicle via communications module 22. In a third wireless communication example, a user provides the desired departure times to an affiliated website (e.g., www.onstar.com), which then formats and wirelessly transmits the information to the vehicle via communications module 22. The departure time information in these examples may be provided to the vehicle directly or indirectly (e.g., through a call center, third party dealership, service center, other back-end facility, etc.) or to some other suitable destination.

Step 204 receives one or more conditioning preference(s). In addition to providing a desired departure time as described in step 202, a user can also dictate which vehicle components are to be conditioned and the settings for such conditioning. For example, a user can select certain heated seat settings (e.g., which heated seats 92 are to be activated and their corresponding temperature setting), heated steering wheel and heated mirror settings, and HVAC settings (e.g., preferred temperatures for single or dual climate zones, front and rear defrost settings, etc.). The user can also select conditioning preferences that contribute to better performance, energy consumption, and reduced wear and tear. For instance, skilled artisans will appreciate that certain vehicle battery packs for PHEVs, HEVs and BEVs operate better if the battery pack is maintained in an optimum temperature range. Thus, step 204 may receive a conditioning preference that instructs the vehicle to warm up vehicle battery pack 96 on a cold day or cool it down on a hot one; the same is true for heated engine block 98, which may be used with a traditional internal combustion engine. In addition, the user can enter seasonal conditioning preferences (e.g., heated seats in winter and air conditioning in summer) and they can prioritize their conditioning preferences.

These and other conditioning preferences can be stored in memory device 110 so that the user does not have to constantly provide them to the conditioning system, or they can be entered each time anew. Of course, these are only some of the examples of conditioning preferences that may be received in step 204, as others are also possible. For instance, the vehicle may come equipped with default conditioning preferences from the factory or dealer. In such a case, it may not be necessary for the user to actually provide the conditioning preferences, as they may be automatically obtained or retrieved from some other module in the vehicle or elsewhere. In addition, any of the exemplary methods and techniques mentioned above in conjunction with entering desired departure times in step 202 may also be used to enter conditioning preferences in step 204. Other embodiments are certainly possible.

Step 208 senses one or more vehicle condition(s), including conditions that are internal and/or external to the vehicle. This information, along with the information gathered in steps 202-204, may be subsequently used by a conditioning algorithm to control or manipulate certain aspects of the vehicle such that the vehicle is ready to go at the desired departure time. As described above in more detail, the present method may use any combination of external sensors 70 (e.g., environmental sensors, etc.), internal sensors 72 (e.g., environmental sensors, component sensors, etc.), and/or propulsion sensors 74 to gather vehicle conditions. Consider the example where a user programs the vehicle to wake up and bring the vehicle cabin to a specific temperature by a desired departure time. Before conditioning the vehicle in this way, method 200 may need to know the temperature outside (provided by external sensor 70), the temperature within the cabin (provided by internal sensor 72), and the engine temperature (provided by propulsion sensor 74) in order to determine how much time is required to heat up the cabin to the requested temperature. This is only one example of the use of vehicle conditions, as many others are also possible. It is possible for step 208 to sense one or more vehicle conditions by gathering them from some other device that is located on the vehicle and has already gathered the data, or from a remote facility (e.g., a call center or weather-related service could telematically provide the vehicle with a 24-hour weather report for the GPS-determined position of the vehicle).

The vehicle conditions or readings gathered in step 208, as well as any other data used by the present method, may be representative of a single value, a number of values averaged or filtered over time, and/or values obtained according to some other technique known in the art. For instance, internal or external temperature readings obtained in step 208 may be gathered over a sampling period and then averaged or filtered according to a known technique in order to reduce noise and avoid any temporary fluctuations. At this point, method 200 generally has the input that it needs to execute a conditioning algorithm that determines when the vehicle should wake up and begin the conditioning process.

Step 210 executes or runs a conditioning algorithm. Generally speaking, the conditioning algorithm predicts or estimates a conditioning start time by subtracting a conditioning duration from the departure time that was entered in step 202.

Conditioning Start Time=Departure Time−Conditioning Duration  (Equation 1)

For example, if the user indicates that they wish to leave at 8:00 AM (departure time) with an internal cabin temperature of 22° C. (conditioning preference) and the conditioning algorithm in step 210 calculates that 15 minutes (conditioning duration) is required to bring the cabin to this temperature, then the conditioning start time is 7:45 AM. Those skilled in the art will appreciate that there are a number of different ways in which the conditioning duration may be calculated, including the exemplary technique described below.

According to one embodiment, step 210 inputs the information provided in steps 204 and 208 into one or more data structures, such as look-up tables, which then output the total amount of conditioning energy needed to bring the vehicle aspect in question to the desired conditioning level (i.e., the total amount of conditioning energy needed for the conditioning event). For instance, if the current cabin temperature is 0° C. and the desired cabin temperature is 22° C., then a look-up table populated with empirical data may return a conditioning energy of 1,600 KJ. Put differently, the 1,600 KJ represents the total amount of energy that is needed to raise the internal temperature of a particular vehicle cabin from 0° C. to 22° C. using a particular HVAC system. The information stored in the look-up table can be empirically determined during design and testing of the vehicle, it can be calculated according to one or more equations or formulas, it can be simulated or modeled, or it can be derived according to some other technique. Of course, additional or different information—other than the inputs from steps 204 and 208—may be provided to the look-up table or other data structure in order to determine the amount of conditioning energy needed. Because the amount of conditioning energy is now known and the conditioning power of the vehicle component involved is also known (the HVAC system in the preceding example has a certain power rating), step 210 can use the following equation to solve for the conditioning duration:

Conditioning Energy (*KJ*)=Conditioning Power (*KW*)
\*Conditioning Duration (Sec)    (Equation 2)

Equation 2 enables the conditioning algorithm to divide the conditioning energy by the conditioning power for the particular vehicle component involved to determine the conditioning duration.

Step 210 may take into consideration factors such as heat loss or other types of energy loss when determining the conditioning duration. These factors may be figured into the look-up table or accounted for in some other way. In the event that the user has provided more than one conditioning preference, step 210 can use the most onerous or time consuming preference to calculate a single conditioning duration. For instance, consider the example where a user has requested that the cabin temperature be at 22° C., that the driver seat be heated to its highest heat setting, and that the plug-in hybrid electric vehicle (PHEV) battery pack be maintained at an optimum operating temperature of 30° C. by the desired departure time. The conditioning algorithm may determine that the cabin temperature conditioning will take 15 minutes, the heated seat conditioning will take 5 minutes, and the battery pack conditioning will take 25 minutes. In this case, conditioning the battery pack is the most onerous or time consuming conditioning event, thus, a single conditioning duration could be based on this event. In another embodiment, step 210 determines multiple conditioning durations; one for each conditioning preference provided by the user. In the example above, three separate conditioning durations could be determined, one for cabin temperature conditioning, one for heated seat conditioning, and one for battery pack conditioning.

As will be subsequently explained, the different conditioning preferences or events may be addressed concurrently, sequentially, staggered, or according to some other timing arrangement. For instance, it is possible for all three conditioning events in the preceding example to be started or initiated when the method begins to condition the vehicle battery pack. Although this would ensure the completion of all three conditioning events by the desired departure time, some energy would be wasted because the conditioning of the cabin temperature and heated seat do not require the full 25 minutes that is needed for battery conditioning. It is therefore possible for each of these three conditioning events be started or initiated at a different or staggered conditioning start time—battery conditioning could begin first, followed by heating the cabin, and finally heating the seat. One potential reason for using staggered or offset start times is to address potential limitations in utility power source capacity. Other techniques are certainly possible.

Now that step 210 has estimated a conditioning duration, a conditioning start time can be determined. In one embodiment, the method simply subtracts the calculated conditioning duration from the desired departure time entered in step 202 to determine a conditioning start time. In another embodiment, the method determines a conditioning start time as well as a conditioning check time, which can be anytime before the actual conditioning start time. The conditioning check time allows the vehicle to wake up and check to see if various vehicle conditions have changed substantially. If the vehicle conditions are generally the same as previously determined, then the conditioning start time previously determined will remain the same. If, however, the vehicle conditions have changed by a certain degree (e.g., a predetermine amount, a percentage of the readings, etc.), then the conditioning algorithm may need to be executed again in order to determine a new conditioning start time. Consider the example where the outside temperature drops by 10° C. in between the time when step 210 calculates a first conditioning duration and when the vehicle wakes up to double check the vehicle conditions. If the user has programmed the vehicle to heat the cabin up to a certain temperature, then the conditioning duration will likely take longer as the cabin is starting from a lower temperature. In such a case, the conditioning start time will have to be pushed back so that the vehicle is woken up earlier to accomplish this task.

In one embodiment, multiple conditioning check times are established at different intervals (e.g., the conditioning system turns on at preset intervals like every thirty minutes, every two hours, etc). In a different embodiment, the conditioning system activates on-demand when it senses that one or more vehicle conditions have changed (e.g., temperature changes, weather forecast changes compared to previously predicted, etc.). As described above, weather forecast changes may be determined from information telematically gathered from a remote facility like a call center or weather-related service. Other techniques can be used as well, for example, a combination of preset interval and on-demand features can be used. It should be appreciated that the use of a conditioning check time to wake the vehicle up early and confirm the vehicle conditions is optional; it is possible for method 200 to bypass steps 214-218 and simply wake up the vehicle at the originally scheduled conditioning start time and perform conditioning, step 220.

Step 212 involves waking the vehicle up at the check time and double checking one or more vehicle conditions. The check time—which according to one embodiment can be stored in memory device 110—may be compared to one or more time sources, including an internal vehicle clock, GPS time (e.g., retrieved via GPS receiver 64), CDMA time (e.g., retrieved via communications module 22), telematics time, etc. In case the time sources are inconsistent, memory device 110 can store a preference order which instructs processing device 112 of the order in which the time sources are to be consulted. For example, GPS time may have the highest priority followed by CDMA time, vehicle internal clock time, and so on. Other embodiments are possible as well. The same principle can be applied to step 220, which determines when it is the conditioning start time.

Step 214 compares vehicle conditions sensed at step 208 to current conditions recently determined at step 212. The output of this step can be a substantially different change or not a substantially different change. As described earlier, if one or more conditions have substantially changed (e.g., significant temperature change, loss of external power source, etc.) then the conditioning may require more or less time and therefore the conditioning may start earlier or later than originally scheduled. If this is the case, the method proceeds to step 218 where a new conditioning start time is determined; this may be done by rerunning the conditioning algorithm with the new vehicle conditions and then waiting for the new conditioning start time. If the previous vehicle conditions sensed at step 208 are not substantially different to the current vehicle conditions (e.g., ±1° C. temperature difference, etc.) then the method may proceed to step 216 where it waits for the initial conditioning start time (i.e., the conditioning start time calculated in step 210).

Step 220 conditions one or more aspects of vehicle at the conditioning start time. Depending on the conditioning preferences that were selected by the user or preprogrammed into the vehicle, step 220 may activate and control any of the vehicle components 26, as previously described. The conditioning can start gradually where one component is conditioned first then another component is later conditioned, etc. (i.e., staggered times); however, all the components can be conditioned at the same as well. For example, in one embodiment, the component requiring most of the conditioning time starts first, then the component requiring the second most conditioning time will start next while the first component is still being conditioned, etc. In another embodiment, all the components requiring conditioning start at the same time or relatively close to one another, where the components requiring more conditioning energy are conditioned at a higher pace than the components requiring less conditioning energy. These are only few exemplary embodiments. By waking the vehicle up and conditioning different aspects of the vehicle according to specifically determined conditioning start times that are based on the amount of time needed to perform a certain task, the present method is able to more efficiently condition the vehicle and have it ready for the user at the desired departure time.

Step 222 is an optional step that provides the user with a conditioning status. There are several techniques to provide a conditioning status including audio, visual, and/or other techniques. In one embodiment, a conditioning status consisting of a display statement (e.g., overhead, dashboard, radio display, etc.) is provided via visual interface 50 after a key-on start. In another embodiment, an audio message informing the user about the conditioning status is provided via audible interface 52 after a key-on start. It is also possible provide the user with a message in the event that conditioning is interrupted (e.g., user starts vehicle before scheduled departure time), not finished (e.g., conditioning exceeds the scheduler departure time) or failed. These are some examples as other are also possible.

It is possible for the conditioning activities to automatically turn off if the user does not perform a triggering event such as opening a vehicle door, performing a key-on start, etc. within so many minutes of the desired departure time (e.g., 15 minutes after the scheduled departure time, etc.) The user may configure this turn-off time via user interface 20, communications module 22 and/or some other method. This prevents the vehicle from unnecessarily using fuel in the event that the user is not able to make the desired departure time.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For instance, the conditioning algorithm may use one or more recursive inputs with its calculations, as is understood in the art. Recursive inputs may help the conditioning algorithm more accurately predict the conditioning performance of a previously conditioned component. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for conditioning one or more aspects of a vehicle, comprising the steps of:
    (a) receiving a departure time;
    (b) sensing a vehicle condition at a first time;
    (c) using a control module to execute a conditioning algorithm, wherein the conditioning algorithm uses the departure time and the vehicle condition sensed at the first time to determine a conditioning start time;
    (d) waking up the vehicle and sensing the same vehicle condition at a second time that is after the sensing at the first time but before the conditioning start time, if the same vehicle condition sensed at the first and second times differs by a certain degree then executing the conditioning algorithm again to determine a new conditioning start time, and if the same vehicle condition sensed at the first and second times does not differ by a certain degree then keeping the initial conditioning start time; and
    (e) conditioning one or more aspects of the vehicle at the conditioning start time.

2. The method of claim 1, wherein step (a) further comprises receiving the departure time from a user who provides the departure time via a user interface located in the vehicle.

3. The method of claim 1, wherein step (a) further comprises receiving the departure time from a user who provides the departure time via wireless communication with a communications module located in the vehicle.

4. The method of claim 1, wherein step (b) further comprises sensing at least one vehicle condition selected from the group consisting of: outside temperature, outside humidity, outside precipitation, cabin temperature, cabin humidity, component temperature, component settings, battery pack or fuel cell temperature, battery pack or fuel cell voltage, battery pack or fuel cell amperage, and engine temperature.

5. The method of claim 1, wherein step (a) further comprises receiving the departure time and a conditioning preference; and step (c) further comprises executing the conditioning algorithm, wherein the conditioning algorithm uses the departure time, the conditioning preference, and the vehicle condition sensed at the first or second time to determine the conditioning start time.

6. The method of claim 5, wherein the conditioning algorithm uses the conditioning preference and the vehicle condition sensed at the first or second time to determine a conditioning duration, and then the conditioning algorithm subtracts the conditioning duration from the departure time to determine the conditioning start time.

7. The method of claim 6, wherein the conditioning algorithm inputs the conditioning preference and the vehicle condition sensed at the first or second time into a look-up table which outputs a conditioning energy needed to condition the one or more aspects of the vehicle with a vehicle component, and the conditioning algorithm then divides the conditioning energy by a conditioning power for the vehicle component to determine the conditioning duration.

8. The method of claim 1, wherein step (a) further comprises receiving the departure time and a plurality of conditioning preferences; step (c) further comprises executing the conditioning algorithm, wherein the conditioning algorithm determines a conditioning duration for the most onerous of the plurality of conditioning preferences, and uses the conditioning duration for the most onerous conditioning preference to determine a single conditioning start time; and step (e) further comprises conditioning the one or more aspects of the vehicle at the single conditioning start time.

9. A method for conditioning one or more aspects of a vehicle, comprising the steps of:
(a) receiving a departure time and a plurality of conditioning preferences;
(b) sensing a first vehicle condition;
(c) using a control module to execute a conditioning algorithm, wherein the conditioning algorithm uses the first vehicle condition to determine at least some of a plurality of conditioning durations for the plurality of conditioning preferences, and uses the plurality of conditioning durations and the departure time to determine a plurality of staggered conditioning start times;
(d) waking up the vehicle and sensing a second vehicle condition at a time that is before the plurality of staggered conditioning start times, if the first and second vehicle conditions differ by a certain degree then executing the conditioning algorithm again to determine one or more new staggered conditioning start times, and if the first and second vehicle conditions do not differ by a certain degree then keeping the initial plurality of staggered conditioning start times; and
(e) conditioning the one or more aspects of the vehicle at the plurality of staggered conditioning start times.

10. The method of claim 1, wherein step (e) further comprises conditioning the one or more aspects of the vehicle at the conditioning start time, and the conditioning start time is determined by using at least one of the following time sources: global positioning system (GPS) time and code division multiple access (CDMA) time.

11. The method of claim 1, wherein step (e) further comprises conditioning an aspect of the vehicle at the conditioning start time by activating at least one component selected from the group consisting of: a heated or cooled seat, a heated steering wheel, a heated engine block, a heated mirror, a cabin HVAC system, a heating or cooling element for a battery pack, a heating or cooling element for a battery charger, and a heating or cooling element for a fuel cell.

12. A method for conditioning one or more aspects of a vehicle, comprising the steps of:
(a) receiving a departure time;
(b) receiving a plurality of conditioning preferences relating to a plurality of aspects of the vehicle;
(c) using a control module to execute a conditioning algorithm, wherein the conditioning algorithm uses the departure time and the plurality of conditioning preferences to determine one or more conditioning start times; and
(d) conditioning the plurality of aspects of the vehicle by activating a plurality of vehicle components, each having a controllable thermal output, in accordance with the one or more conditioning start times, wherein at least one of the activated vehicle components is a heating or cooling element that conditions a battery pack at a conditioning start time, a heating or cooling element that conditions a battery charger at a conditioning start time, or a heating or cooling element that conditions a fuel cell at a conditioning start time.

13. The method of claim 12, wherein the method further comprises the step of sensing a vehicle condition; and step (c) further comprises executing the conditioning algorithm, wherein the conditioning algorithm uses the departure time, the plurality of conditioning preferences, and the vehicle condition to determine the one or more conditioning start times.

14. The method of claim 13, wherein the vehicle condition is selected from the group consisting of: outside temperature, outside humidity, outside precipitation, cabin temperature, cabin humidity, component temperature, component settings, battery pack or fuel cell temperature, battery pack or fuel cell voltage, battery pack or fuel cell amperage, and engine temperature.

15. The method of claim 13, wherein the conditioning algorithm uses the plurality of conditioning preferences and the vehicle condition to determine one or more conditioning durations, and then the conditioning algorithm subtracts the one or more conditioning durations from the departure time to determine the one or more conditioning start times.

16. The method of claim 15, wherein the conditioning algorithm inputs the plurality of conditioning preferences and the vehicle condition into a look-up table which outputs a conditioning energy needed to condition each of the plurality of aspects of the vehicle with a corresponding vehicle component, and the conditioning algorithm then divides the conditioning energy by a conditioning power for the corresponding vehicle component to determine the one or more conditioning durations.

17. The method of claim 13, further comprising the step of: waking up the vehicle and sensing the same vehicle condition at a conditioning check time that is before the one or more conditioning start times, if the vehicle condition differs by a certain degree then executing the conditioning algorithm again to determine one or more new conditioning start times, and if the vehicle condition does not differ by a certain degree then keeping the initial one or more conditioning start times.

18. The method of claim 12, wherein step (d) further comprises activating a plurality of vehicle components selected from the group consisting of: a heated or cooled seat, a heated steering wheel, a heated engine block, a heated mirror, a cabin HVAC system, a heating or cooling element for a battery pack, a heating or cooling element for a battery charger, and a heating or cooling element for a fuel cell.

19. A method for conditioning one or more aspects of a vehicle, comprising the steps of:
(a) receiving a departure time;
(b) receiving a conditioning preference;

(c) sensing a vehicle condition at a first time;

(d) using a control module to execute a conditioning algorithm, wherein the conditioning algorithm uses the conditioning preference and the vehicle condition to determine a conditioning duration, and the conditioning algorithm uses the departure time and the conditioning duration to determine a conditioning start time;

(e) waking up the vehicle and sensing the same vehicle condition at a second time after the sensing at the first time but before the condition start time, if the vehicle condition sensed at the first and second times differs by a certain degree then executing the conditioning algorithm again to determine a new conditioning start time, and if the vehicle condition sensed at the first and second times does not differ by a certain degree then keeping the initial conditioning start time; and (f) conditioning one or more aspects of the vehicle at the conditioning start time.

20. The method of claim 12, wherein step (c) further comprises executing the conditioning algorithm, wherein the conditioning algorithm determines a conditioning duration for the most onerous of the plurality of conditioning preferences, and uses the conditioning duration for the most onerous conditioning preference to determine a single conditioning start time; and step (d) further comprises conditioning the plurality of aspects of the vehicle at the single conditioning start time.

21. A method for conditioning a plurality of aspects of a vehicle, comprising the steps of:

(a) receiving a departure time;

(b) receiving a plurality of conditioning preferences relating to the plurality of aspects of the vehicle;

(c) using a control module to execute a conditioning algorithm, wherein the conditioning algorithm determines a plurality of conditioning durations for the plurality of conditioning preferences, and uses the plurality of conditioning durations to determine a plurality of staggered conditioning start times; and (d) conditioning the plurality of aspects of the vehicle by activating a plurality of vehicle components, each having a controllable thermal output, in accordance with the plurality of staggered conditioning start times.

* * * * *